United States Patent
Kumor

(10) Patent No.: US 6,795,698 B1
(45) Date of Patent: Sep. 21, 2004

(54) METHOD AND APPARATUS FOR EMBEDDING GLOBAL POSITIONING SYSTEM (GPS) DATA IN MOBILE TELEPHONE CALL DATA

(75) Inventor: Jan W. Kumor, Centreville, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/547,530

(22) Filed: Apr. 12, 2000

(51) Int. Cl.$^7$ .............................................. H04M 11/00
(52) U.S. Cl. ............................. 455/404.1; 455/456.1; 455/12.1; 704/223
(58) Field of Search ................................. 455/456, 457, 455/404.1, 405, 414, 403; 342/357.01, 357.07, 357.06, 357.08; 701/211, 213, 215, 214; 704/223, 219

(56) References Cited

U.S. PATENT DOCUMENTS

| | | | | |
|---|---|---|---|---|
| 5,043,736 A | * | 8/1991 | Darnell et al. | 342/357.1 |
| 5,726,893 A | * | 3/1998 | Schuchman et al. | 455/456.3 |
| 5,797,091 A | * | 8/1998 | Clise et al. | 455/404 |
| 5,999,124 A | * | 12/1999 | Sheynblat | 342/357.09 |
| 6,085,090 A | * | 7/2000 | Yee et al. | 455/440 |
| 6,122,506 A | * | 9/2000 | Lau et al. | 455/427 |
| 6,150,980 A | * | 11/2000 | Krasner | 342/357.1 |
| 6,185,427 B1 | * | 2/2001 | Krasner et al. | 455/456 |
| 6,320,535 B1 | * | 11/2001 | Hillman et al. | 342/357.1 |
| 6,327,471 B1 | * | 12/2001 | Song | 455/440 |
| 6,377,923 B1 | * | 4/2002 | Hershkovits et al. | 704/253 |
| 6,429,811 B1 | * | 8/2002 | Zhao et al. | 342/357.09 |
| 6,449,485 B1 | * | 9/2002 | Anzil | 455/456 |

FOREIGN PATENT DOCUMENTS

| | | |
|---|---|---|
| WO | 9517686 | 6/1995 |
| WO | 0167671 | 9/2001 |

* cited by examiner

Primary Examiner—Tilahun Gesesse
(74) Attorney, Agent, or Firm—Stetina Brunda Garred & Brucker

(57) ABSTRACT

In a mobile telephone, position data are obtained from an integral Global Positioning System (GPS) receiver (10) and edited in an editor (14) to provide a fixed number of bits of position and velocity data every second. The data are stored in a buffer (18) until voice samples become available and are then embedded in successive voice samples such that only a small percentage of bits in each voice sample are affected by the presence of the position data. The position and velocity data may be recovered at a receiver at a fixed location or at another mobile location.

20 Claims, 2 Drawing Sheets

METHOD AND APPARATUS FOR EMBEDDING GLOBAL POSITIONING SYSTEM (GPS) DATA IN MOBILE TELEPHONE CALL DATA

BACKGROUND OF THE INVENTION

This invention relates generally to mobile or cellular telephone systems and, more particularly, to mobile telephones that operate under the standard known as Global Systems for Mobile Communications (GSM). There is a well recognized need to identify the location of cellular telephone users, to provide emergency services such as police, medical assistance, fire response and rescue, and also to help the operator of the system to provide improved cellular communications. The Global Positioning System (GPS) permits users of GPS receivers to determine their respective positions to a high degree of accuracy. GPS receivers are used for a variety of applications, including navigation anywhere on or near the earth, and precision survey work. GPS data can be provided in conventional latitude and longitude form, or in terms of street addresses. It will be appreciated from the foregoing that there are many situations in which it would be desirable to have GPS location data pertaining to a mobile telephone user made available to system operators, and perhaps to a user designated to receive voice data from the sending user telephone. The present invention addresses this need, as will become apparent from the following summary and detailed description.

SUMMARY OF THE INVENTION

The present invention resides in a novel method, and corresponding apparatus for its use, for embedding GPS location data pertaining to a GSM cellular telephone in successive samples of voice data transmitted by the GSM cellular telephone. The GPS data are obtained from a GPS receiver integrated into the GSM cellular telephone, to provide telephone location data to a receiver of the voice data.

Briefly, and in general terms, the method of the invention includes the steps of obtaining position data using a Global Positioning System (GPS) receiver integrated into a GSM cellular telephone; storing the position data in a buffer; processing samples of voice data for transmission from the GSM cellular telephone; embedding position data in successive samples of voice data; transmitting the successive samples of voice data, including the embedded position data; receiving successive samples of voice data and embedded position data at a cellular telephone receiver; and recovering the embedded position data from the successive samples of voice data.

More specifically, the step of obtaining position data includes editing and formatting the position data to contain a fixed number of bits of data each second. Further, the fixed number of bits represents position data for three orthogonal directions, velocity data for the same three directions, and a figure of merit indicative of reliability of the data. In the illustrative embodiment of the invention, the fixed number of bits per second are formatted as nineteen 16-bit words, including nine words of position data, nine words of velocity data and one word containing the figure of merit.

The invention may also be defined as a cellular telephone using Global Systems for Mobile Communication (GSM) protocols, the telephone comprising a voice sampling module; a GSM voice compression module utilizing a Regular Pulse Excitation/Long-Term Predictor (RPE/LTP); a Global Positioning System (GPS) receiver integrated into the telephone, for generating GPS position data; a GPS data editor, for reformatting the GPS data; a GPS data buffer for temporally storing GPS data until voice samples become available; a GPS data injection module, for encoding GPS data into successive samples of voice data, by replacing selected bits of voice data with GPS data; a transmitter, for transmitting the successive samples of voice data; a receiver, for receiving voice data transmitted from another cellular telephone; and a GPS data recovery module, for recovering embedded position and velocity data from successive voice samples received.

It will be appreciated from the foregoing that the, present invention provides a useful technique for combining GPS location data with voice signals in a GSM format. Other aspects and advantages of the invention will become apparent from the following more detailed description, taken in conjunction with the drawings that are briefly described below.

DESCRIPTION OF THE PREFERRED EMBODIMENT

Figure 1:
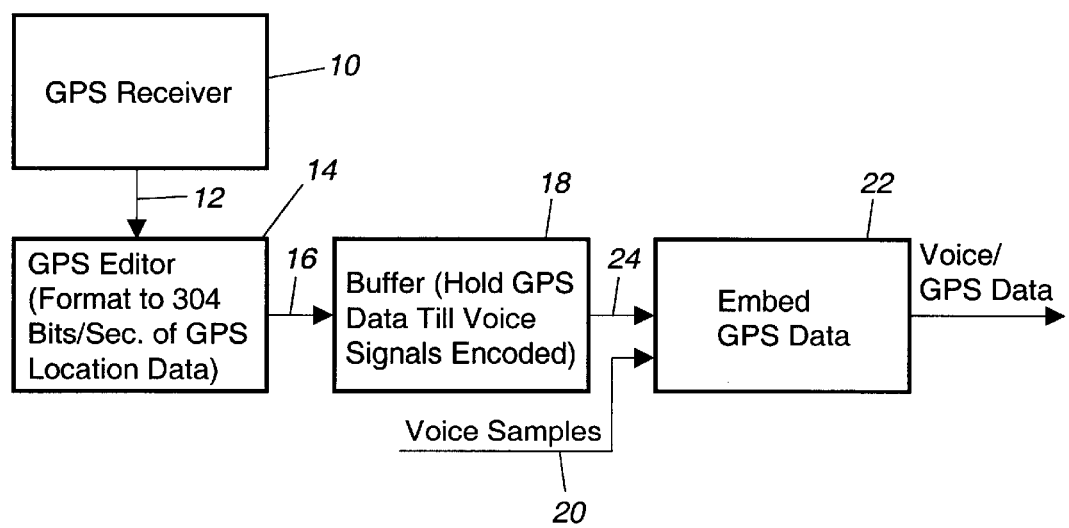
FIG. 1 is block diagram illustrating how the invention combines voice and GPS location data for transmission.

As shown in the drawings for purposes of illustration, the present invention pertains to cellular or mobile telephones operating under a set of protocols known as the Global Systems for Mobile Communication, which will be referred to in this specification by the abbreviation GSM. In accordance with the invention, location data obtained from a Global Positioning System (GPS) receiver integrated into a GSM telephone are embedded into successive samples of voice data transmitted from the GSM telephone, and are received and recovered at a GSM receiver.

FIG. 1 is a block diagram illustrating the principal components employed in embedding GPS data in the samples of voice data. A GPS receiver, indicated by reference numeral 10, provides a stream of GPS location data on output line 12. In a GPS data processor 14, the stream of data on line 12 is edited to provide GPS data at a fixed rate consistent with the rate at which voice data signals are processed. In this example, the GPS data processor 14 edits the incoming GPS location data to provide an edited GPS data stream on output line 16 at a rate of 304 bits per second. The edited GPS data signals on line 16 are stored in a buffer memory 18, where they are held prior to embedding with voice samples, supplied over line 20 in 20-millisecond (ms) samples. In the embedding process, indicated in block 22, the GPS data bits, supplied over line 24 from the buffer 18, are embedded Win nineteen successive voice samples, each of which contains 260 bits. Thus, each second a block of 304 bits of GPS data is embedded as nineteen 16-bit words in nineteen successive speech samples. Since each speech sample contains 260 bits, only 16/260, or approximately 6% of each voice sample is corrupted by the GPS data.

Figure 2:
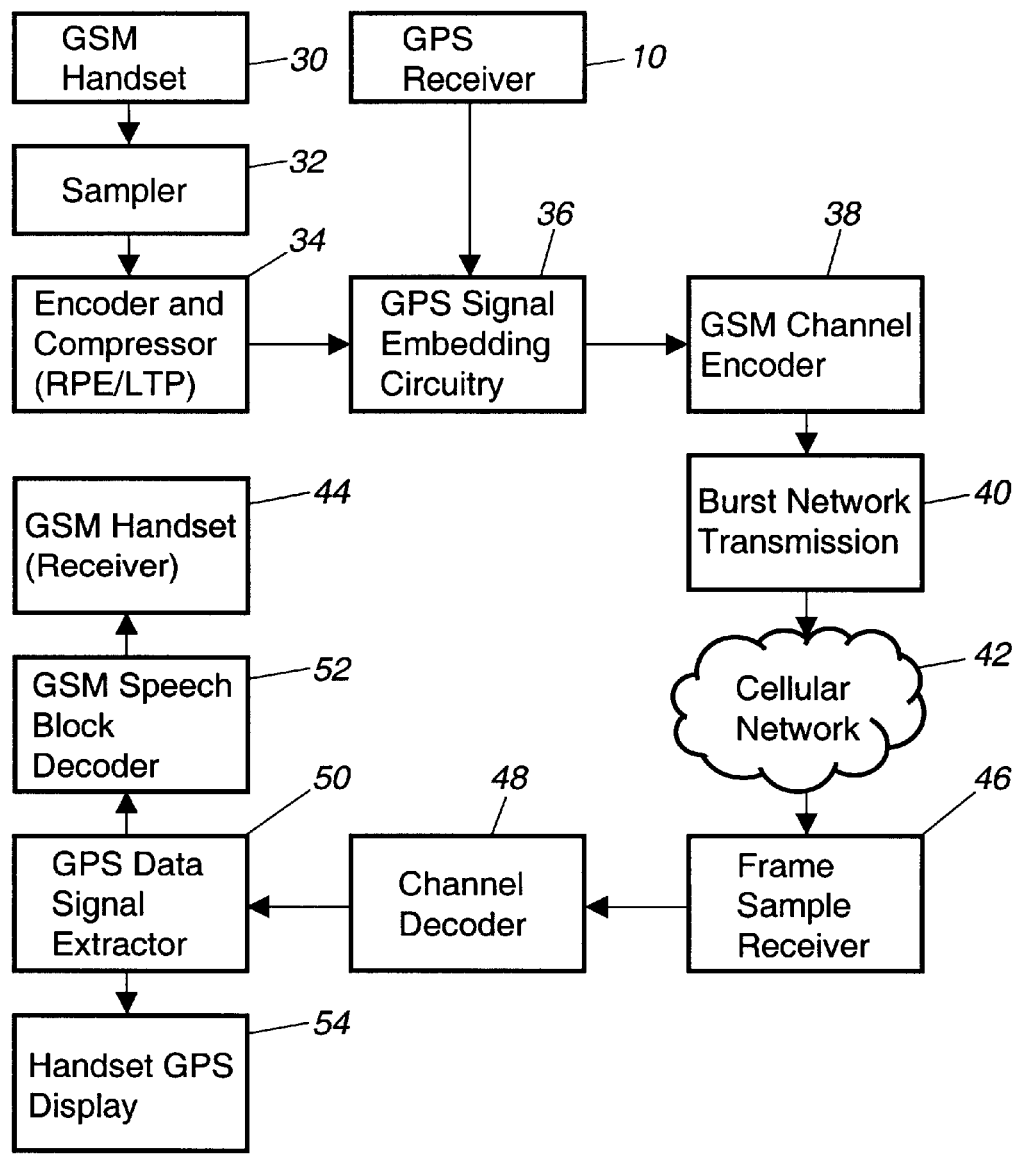
FIG. 2 is a block diagram illustrating data process flow for a GSM/GPS system in accordance with the invention.

FIG. 2 depicts data process flow for a GSM/GPS system in accordance with the invention. Voice signals received at a GSM handset 30 are sampled as indicated in block 32, and then encoded and compressed as indicated in block 34, using GSM voice compression utilizing a coder referred to as a Regular Pulse Excitation/Long-Term Predictor (RPE/LTP).

Then, GPS data signals are injected into the encoded voice samples, as indicated at 36. The resulting signals are subject to conventional GSM channel encoding, as indicated in block 38, and burst network transmission, as indicted in block 40. After transmission through a cellular network, indicated diagrammatically at 42, signals may be received by another GSM telephone 44 and subject to conventional GSM processing steps, including frame sample receiving 46 and channel decoding 48. At this point, in accordance with the invention the GPS data signals are extracted, as indicated at 50, before the final GSM step of speech block decoding 52. Although not apparent from this diagram, GPS data may also be extracted at a base station receiver (not shown) in the network 42. Extracted GPS location data may be displayed in a GPS display device 54, which may be integrated into the receiver handset 44, or may be located at a network receiver somewhere in the cellular network 42.

In GSM encoding of voice data, speech is sampled at a rate of 8 kHz, 12 bits per sample, and then compressed by the RPE/LTP coder 34 into frames of 260 bits each at a 20-millisecond (ms) rate. Bits within each frame of GSM voice data may be categorized into three major classes based on their importance in reproduction of the speech. There are. 50 bits of data designated as Class 1a and deemed the most important. In addition there are 132 bits of data designated as Class 1b and defining Regular Pulse Excitation (RPE) pointer and pulse data and Long Term Predictor (LTP) parameters. Finally there are 78 bits of data designated as Class II and representing RPE pulses and filter parameters. The latter class of bits in each frame are considered the least important from the standpoint of reproduction of encoded speech.

In implementing the present invention, GPS data bits are overwritten into selected speech frame data bits of Class 1b or, Class II category. It was determined experimentally that up to 35% of a GSM frame could be overwritten using the Class 1b and Class II bits only, without audible detection of any difference in the reproduced speech. In the present invention, only about 6% of the bits (16 bits) are overwritten in each frame.

In accordance with another aspect of the invention, GPS data signals are transmitted twice each second for redundancy. It is assumed that any word of the 19 words of GPS data could be lost due to bit error, so the potential for lost GPS data in any one second of transmission is reduced if the 19 words are transmitted twice. The format used is to transmit a first GPS data set (19 frames) followed by six frames of 0s, and then the second GPS data set (19 frames) followed by six frames of 1s. The total is 50 frames (19+6+19+6), which, of course, corresponds to the number of frames of speech data generated by a GSM encoder.

The order of GPS data within each GPS data set is not critical to the invention but in the preferred embodiment the 19-frame set of data is ordered as follows: (1) Nine 16-bit words of position data (e.g., latitude, longitude and altitude), (2) nine 16-bit words of velocity data (e.g., west, north and ascent velocities), and (3) a 16-bit figure of merit (FOM) indicating progress of satellite acquisition, time lock, navigation solution and error approximations). Since position determination using the GPS is an iterative process, the accuracy of which depends on a number of factors, location measurements are always subject to possible errors. The FOM accompanying each set of measurements may be used to interpret the location measurements, or as a measure of their accuracy.

It will be appreciated from the foregoing that the present invention represents a significant advance in mobile telephone systems. In particular, the invention provides for the automatic encoding of location data within the existing voice data format in a GSM telephone system. It will also be appreciated that, although a specific embodiment of the invention has been described in detail for purposes of illustration, various modifications may be made without departing from the spirit and scope of the invention. Accordingly, the invention should not be limited except as by the appended claims.

What is claimed is:

1. A method for automatically providing location data for cellular telephones using Global Systems for Mobile Communication (GSM) protocols, the method comprising the steps of:

obtaining position data using a Global Positioning System (GPS) receiver integrated into a GSM cellular telephone;

editing and formatting the position data to contain a fixed number of bits of data each second, wherein the fixed number of bits represents position data for three orthogonal directions, velocity data for the same three directions, and a figure of merit indicative of reliability of the data;

storing the position data in a buffer;

processing samples of voice data for transmission from the GSM cellular telephone;

embedding position data in successive samples of voice data;

transmitting the successive samples of voice data, including the embedded position data;

receiving successive samples of voice data and embedded position data at a cellular telephone receiver; and recovering the embedded position data from the successive samples of received voice data.

2. A method as defined in claim 1, wherein the fixed number of bits per second are formatted as nineteen 16-bit words, including nine words of position data, nine words of velocity data and one word containing the figure of merit.

3. The method as recited in claim 1 wherein the position data is obtained at the same rate that the voice data is processed.

4. The method as recited in claim 1 wherein the step of embedding position data comprises overriding position data on samples of voice data.

5. The method as recited in claim 4 wherein the step of overriding voice data comprises overriding between 0 and 35% of voice data.

6. The method as recited in claim 4 wherein the step of overriding voice data comprises overriding about 6% of voice data.

7. The method as recited in claim 1 wherein the step of storing position data comprises storing position data until voice data samples are available.

8. The method as recited in claim 1 wherein position data is obtained periodically, such that editing, formatting and embedding position data occurs only when position data is obtained.

9. A cellular telephone using Global Systems for Mobile Communication (GSM) protocols, comprising:

voice sampling module;

a GSM voice compression module utilizing a Regular Pulse Excitation/Long-Term Predictor (RPE/LTP);

a Global Positioning System (GPS) receiver integrated into the telephone, for generating GPS position data;

a GPS data editor for reformatting the GPS position data;

a GPS data buffer for temporarily storing GPS data until voice samples become available;

a GPS data injection module, for encoding GPS data into successive samples of voice data, by replacing selected bits of voice data with GPS data;

a transmitter, for transmitting the successive samples of voice data;

a receiver, for receiving voice data transmitted from another cellular telephone; and a GPS data recovery module, for recovering embedded position and velocity data from successive voice samples received.

10. The cellular telephone as recited in claim 9 wherein the GPS data injection module replaces between 0% and 35% of voice data with position data.

11. The cellular telephone as recited in claim 9 wherein the GPS data injection module replaces about 6% of voice data with position data.

12. A method for automatically providing location data for cellular telephones using Global Systems for Mobile Communication (GSM) protocols, the method comprising the steps of:

obtaining position data using a Global Positioning System (GPS) receiver integrated into a GSM cellular telephone;

editing and formatting the position data to contain a fixed number of bits of data each second, wherein the fixed number of bits represents position data for three orthogonal directions;

storing the position data in a buffer;

processing samples of voice data for transmission from the GSM cellular telephone;

embedding the position data into successive samples of voice data by replacing selected bits of voice data with position data;

transmitting the successive samples of voice data, including the embedded position data;

receiving successive samples of voice data and embedded position data at a cellular telephone receiver; and recovering the embedded position data from the successive samples of voice received data.

13. A method as defined in claim 12, wherein the fixed number of bits further represents velocity data for the same three directions, and a figure of merit indicative of reliability of the data.

14. A method as defined in claim 12, wherein the fixed number of bits per second are formatted as nineteen 16-bit words, including nine words of position data, nine words of velocity data and one word containing the figure of merit.

15. The method as recited in claim 12 wherein the position data is obtained at the same rate that the voice data is processed.

16. The method as recited in claim 12 wherein the step of embedding position data comprises overriding position data on samples of voice data.

17. The method as recited in claim 16 wherein the step of overriding voice data comprises overriding between 0 and 35% of voice data.

18. The method as recited in claim 16 wherein the step of overriding voice data comprises overriding about 6% of voice data.

19. The method as recited in claim 12 wherein the step of storing position data comprises storing position data until voice data samples are available.

20. The method as recited in claim 12 wherein position data is obtained periodically, such that editing, formatting and embedding position data occurs only when position data is obtained.

* * * * *